D. C. HORNER.
WEIGHING SCALE.
APPLICATION FILED MAR. 22, 1913.
1,102,051.
Patented June 30, 1914.
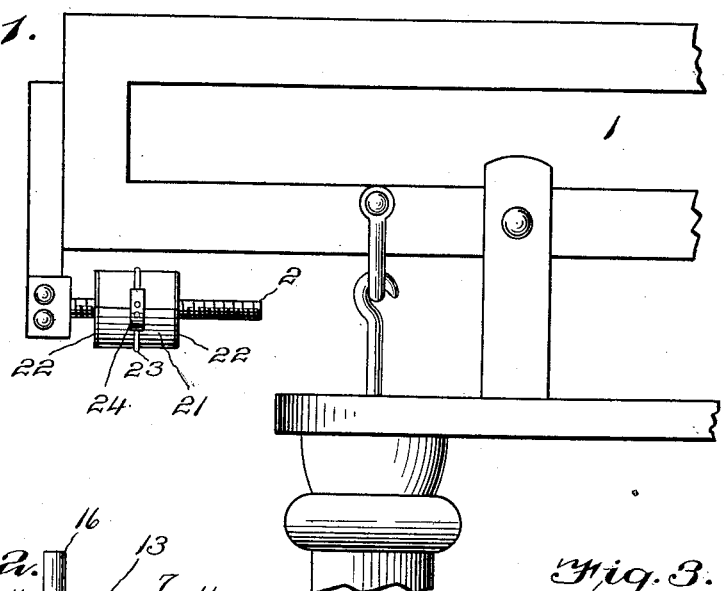
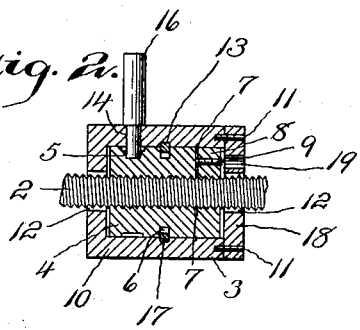
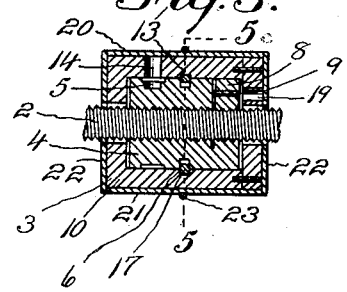
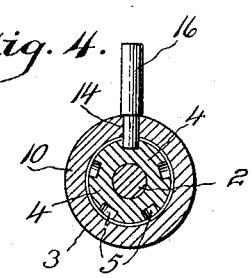
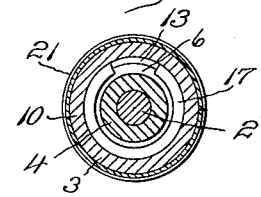
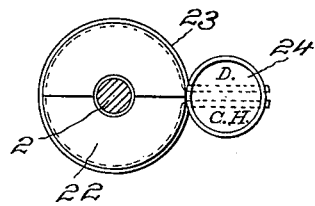
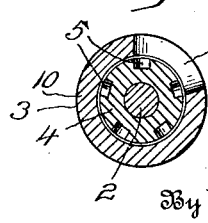
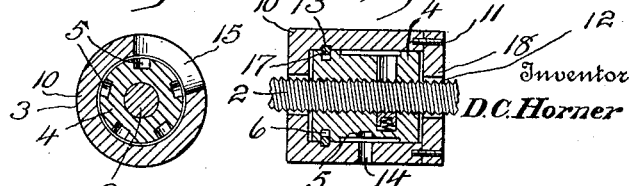
Witnesses
T. P. Britt
E. C. Duffy
Inventor
D. C. Horner
By
Attorneys

UNITED STATES PATENT OFFICE.

DAVID CHAPMAN HORNER, OF ST. JOHNSBURY, VERMONT.

WEIGHING-SCALE.

1,102,051.  Specification of Letters Patent.  Patented June 30, 1914.

Application filed March 22, 1913.  Serial No. 756,267.

*To all whom it may concern:*

Be it known that I, DAVID C. HORNER, a citizen of the United States, residing at St. Johnsbury, in the county of Caledonia and State of Vermont, have invented certain new and useful Improvements in Weighing-Scales; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to weighing scales, but more particularly to the balance ball thereof, and the invention has for its object to provide a construction for preventing the promiscuous manipulation of the balance ball of a scale beam to cause the scale to weigh falsely.

In scales of usual construction there is provided on the scale beam a threaded stud arranged horizontally and parallel with the scale beam upon which threaded stud is arranged a balance ball. By means of this ball the scale can be adjusted in such manner as to weigh correctly and by means of this balance ball any inaccuracies in the scale can be compensated and adjusted. After the balance ball has been set on its threaded stud and the scale beam has therefore been adjusted to weigh correctly it is an easy matter to move the balance ball along its threaded stud so as to cause the scale to weigh falsely. This movement of the balance ball on its stud is done purposely in order to cause the scale to weigh falsely, while in a number of instances the balance ball is moved on its threaded stud by inquisitive persons without knowing the effect that such movement has on the scales.

In order to prevent any movement of the balance ball on its threaded stud by any unauthorized person I have provided a construction which while simple is particularly effective.

It is the common practice in communities to have the scales inspected by an official provided for that purpose and the purpose of this invention is to prevent movement of the balance ball on its threaded stud after said inspector has adjusted the scale and set the ball in its proper position on its threaded stud.

The invention consists in the novel construction of the balancing member or ball and in the novel construction for moving the same on its threaded stud and in the novel construction for setting the ball against movement on its threaded stud and for sealing the same in such manner that any tampering with the balancing member or ball can be instantly detected by the inspector.

The invention further consists in certain novel features of construction and in combinations of parts, all of which will be first fully described and afterward specifically pointed out in the appended claims.

Referring to the accompanying drawing: Figure 1 is a fragmentary view illustrating a portion of a scale beam and illustrating the balance ball in operative position thereon. Fig. 2 is a vertical longitudinal sectional view through the balance ball illustrating the key in position thereon for moving the same. Fig. 3 is a similar view illustrating the balance ball seal. Fig. 4 is a transverse vertical view through the balance ball illustrating the key in position thereon. Fig. 5 is a transverse vertical sectional view taken on line 5—5 of Fig. 3. Fig. 6 is an end elevation of the balance ball, and Fig. 7 is a vertical transverse sectional view illustrating a modification of the construction illustrated in Fig. 4. Figs. 8 and 9 represent sectional views taken transversely and longitudinally of a modification of the invention.

Like numerals of reference indicate the same parts throughout the several figures in which;

1 indicates a scale beam of any ordinary or usual construction, it being understood that the construction of the scale beam proper forms no part of this present invention.

2 indicates the threaded stud upon which the balance ball 3 is arranged in order to adjust or compensate any inaccuracy in the scale beam and to cause the scale to weigh correctly.

Referring now to Fig. 2 it will be seen that the balance ball 3 comprises a central cylindrical threaded core 4, which threaded core 4 is provided, as shown in Figs. 4 and 7, with a plurality of radially disposed chambers 5, while the core 4 is provided centrally thereof with an annular groove 6. Near one end of the threaded core 4 is provided a transverse slot 7 which is cut into the core 4 and through the threaded bore thereof as is illustrated in Figs. 2 and 3. This transverse slot forms a flexible end 8, and threaded longitudinally in said flexible end 8 is a small screw 9, the end of said screw 9 passing through the slot 7 and engaging the inner face of the core 4 as is illustrated in Figs. 2 and 3.

Referring now to the outer casing 10 it will be seen that the same is cylindrical in form and incloses the core 4, one end of the casing 10 being removable and secured to the balance of the casing by means of screws 11 or by any other suitable means. It will be noted that the casing 10 is provided with central openings 12 through which the threaded stud 2 passes. Centrally cut in the bore of the casing 10 is an annular groove 13 as shown in Figs. 2, 3 and 5, while said casing 10 may be provided with a single transverse opening 14 as shown in Figs. 2, 3 and 4, or it may be provided with an elongated slot 15 as illustrated in Fig. 7. In either event said opening 14 or slot 15 in the casing 10 is directly in line with the radially disposed chambers 5 in the core 4 as will appear from the drawing, the purpose of this construction being to provide for the insertion of a key 16 through the casing 10 and into one of the radially disposed chambers 5 in the core 4. Disposed within the two registering annular grooves 6 and 13 in the core 4 and casing 10 is a spring ring 17, said ring 17 expanding along the said annular slots in such manner that the same is partly within the core 4 and partly within the casing 10 as is clearly illustrated in Figs. 2, 3 and 5 to prevent too ready or free turning of the balancing member or core upon the stud. It will be noted that the removable end 18 of the casing 10 is provided with a transverse opening 19 which registers with the transverse screw 9 in the flexible end 8 of the core 4.

20 indicates the seal which comprises a cylindrical covering 21 having ends 22 to encompass and inclose the casing 10, said seal also comprising an encompassing wire 23 and preferably a lead seal 24 which embraces the ends of the encompassing wire 23 and seals the same in the manner illustrated in Fig. 6.

Having thus described the several parts of this invention its operation is as follows: The core 4 and casing 10 being assembled a key 16 is placed in position shown in Figs. 2 and 4 and the balance ball is threaded on its threaded stud 2. In order to properly adjust and compensate the scale the seal 20 is arranged in position on the balance ball but is left unsealed in such manner that the ball can be (by means of the key 16) moved in either direction on its threaded stud 2. When the ball has been thus moved to the proper position so that the scale weighs correctly the key 16 is withdrawn and the transverse screw 9 in the flexible end 8 of the core 4 is threaded inwardly in such manner as to force the flexible end 8 out of its normal position and thus cause the threads in said flexible threaded end to tightly bind on the threads of the threaded stud 2. Any amount of binding can thus be quickly obtained and after the threads of the core 4 have thus been bound against the threaded stud 2 the casing 10 of the ball can be readily rotated in either direction and to any extent without communicating any rotation to the central core 4. When the balance ball has thus been placed in proper position the seal is applied in the manner as shown in Figs. 1, 3 and 6, said seal being of any desired form or construction and should preferably bear a stamp or mark of the inspector such as is illustrated in Fig. 6. After the seal has thus been applied, as illustrated in the drawing, any movement or rotation of the outer casing 10 will not rotate the inner core 4 to any extent whatever and consequently the balance ball cannot be moved in relation to its threaded stud 2 to affect the adjustment of the scale.

It is to be understood that any suitable and effective seal of the balance ball can be employed without departing from the spirit of this invention as there are many obvious ways in which the balance ball can be sealed after the same has been placed in proper position on the threaded stud 2, the construction of sealing shown in the drawing being of course one of the many forms which can be employed in this capacity.

As suggested by the modification as disclosed by Figs. 8 and 9 a resiliently or spring controlled friction or brake-like member or piston 25 is arranged within the member or core 4 with one end in contact with the perimetric or threaded surface of the stud. The brake-like member or piston 25 is located within a vertical socket or chamber 26 in the core 4 and is hollow or tubular to receive a spring 27 seated upon the bottom of said socket or chamber to exert an upward pressure upon said piston or brake to cause the latter to bear upon said stud whereby the core will be restrained from too readily turning upon the stud.

Having thus fully described the invention the use and utility of the same is at once apparent and it is evident to those skilled in the art that various slight changes can be made in the construction as shown and described without departing from the spirit of this invention, and I consider myself clearly entitled to all such changes and modifications as fall within the limit and scope of the appended claims.

What I claim as new and desire to secure by Letters Patent of the United States is:—

1. A device of the type described, including a threaded scale-beam stud, a balancing member for said scale-beam threaded upon said stud, said balancing member having a plurality of perimetric chambers or sockets therein, a revoluble member encompassing said balancing member having openings therein to register with said chambers or sockets, and means insertible through said openings into said chambers for adjusting said balancing member.

2. A device of the type described, including a threaded scale-beam stud, a balancing member for said scale-beam threaded upon said stud, means for effecting a binding action between the threads of said balancing member and said stud, a revoluble member encompassing said balancing member, said balancing member having sundry perimetric sockets or chambers therein and said revoluble member having openings therein to register with said sockets, and means insertible through said openings into said sockets for adjusting said balancing member.

3. A device of the type described, including a scale-beam stud, a balancing member for said scale-beam, itself including a core having screw-threaded connection with said stud, a revoluble member encompassing said core, said revoluble member and said core having opposed grooves therein, and an annular resilient member let into said grooves, and means for adjusting said balancing member.

4. A device of the type described, including a scale-beam stud, a balancing member for said scale-beam having screw-threaded connection with said stud, means adapted to cause a binding action between the threads of said balancing member and said stud, an outer casing for said balancing member, and a seal comprising a soft-metal disk and a wire encompassing said outer casing and having its end-portions received and held by said disk.

In testimony whereof, I affix my signature, in presence of two witnesses.

DAVID CHAPMAN HORNER.

Witnesses:
EDWIN C. POTTER,
ROBERT E. FRENCH.

---

Copies of this patent may be obtained for five cents each, by addressing the "Commissioner of Patents, Washington, D. C."